United States Patent [19]

Peterson et al.

[11] Patent Number: 5,431,526
[45] Date of Patent: Jul. 11, 1995

[54] LIFTING SYSTEM FOR TRANSPORTING VEHICLE

[76] Inventors: Edward A. Peterson; Gail A. Peterson, both of 513 S. Pine St., Chelsea, Okla. 75016-1817

[21] Appl. No.: 908,331
[22] Filed: Jul. 6, 1992
[51] Int. Cl.⁶ .................... B60P 1/00; B65G 67/02; B66C 23/04
[52] U.S. Cl. .................... 414/543; 212/295; 212/223; 212/299; 212/231; 414/540; 414/462; 414/921
[58] Field of Search ............... 414/542, 543, 921, 462, 414/555, 550; 212/182, 179–180, 223, 227, 229–232, 237, 244, 255, 260, 263, 249, 264, 265, 254, 199; 4/11

[56] References Cited

U.S. PATENT DOCUMENTS

| | | | |
|---|---|---|---|
| 3,048,371 | 8/1962 | Klimek, Jr. | 212/180 |
| 3,978,989 | 9/1976 | Avila, Jr. | 414/543 |
| 4,069,922 | 1/1978 | Hawkins | 414/543 |
| 4,398,858 | 8/1983 | Paffrath | 414/542 |
| 4,406,574 | 9/1983 | Riley | 414/543 |
| 4,671,731 | 6/1987 | Harlan | 212/180 |
| 5,090,580 | 2/1992 | Nelson | 414/921 |
| 5,205,700 | 4/1993 | Lin et al. | 414/921 |

FOREIGN PATENT DOCUMENTS 2160170 12/1985 United Kingdom ............... 212/231

OTHER PUBLICATIONS

Pacific Electric Cranes; Pacific Series 66; 4 pages.

Primary Examiner—Michael S. Huppert
Assistant Examiner—R. B. Johnson
Attorney, Agent, or Firm—Gregory J. Nelson

[57] ABSTRACT

A lift mountable in a transporting vehicle for loading and unloading objects such as small motorized carts. The lift includes an adjustable stand and pivotal boom assembly. An electric motor selectively operates a drum on which is wound a lifting cable or strap which terminates at a lifting hook or claw which is attachable to the cart or object. The adjustability of the stand and boom make the lift highly versatile and adaptable for convenient mounting in different vehicle configurations.

2 Claims, 3 Drawing Sheets

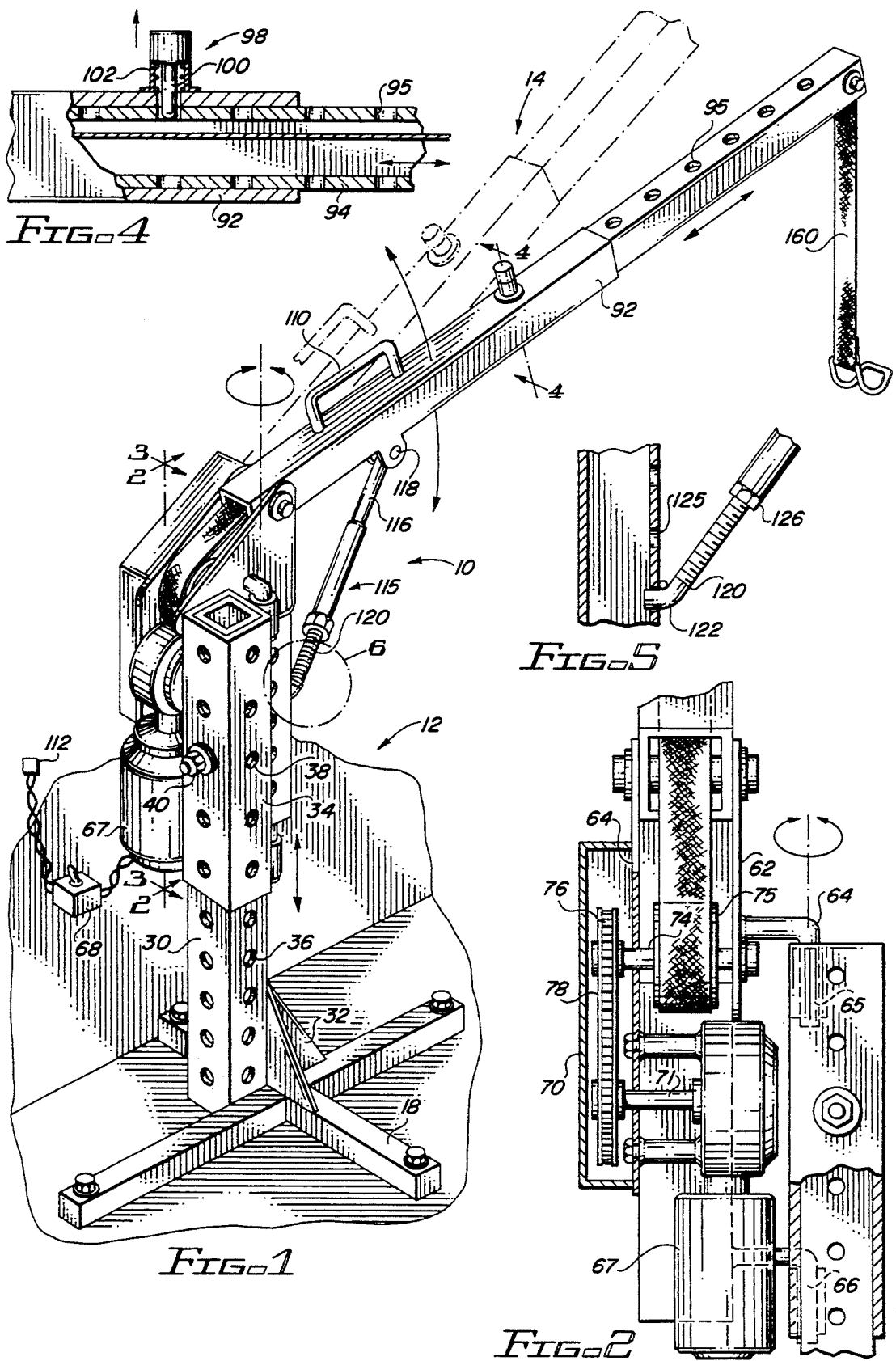

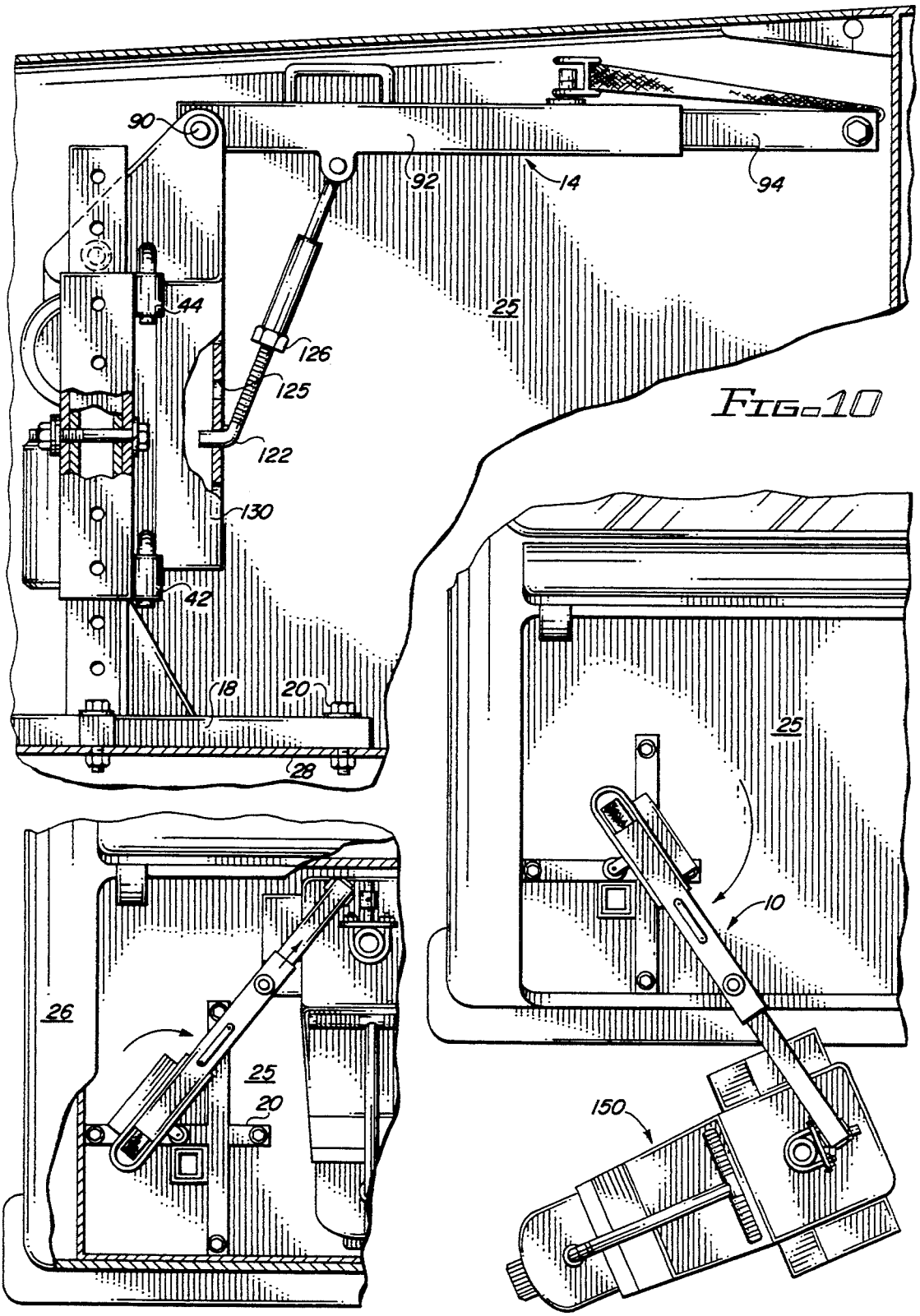

LIFTING SYSTEM FOR TRANSPORTING VEHICLE

The present invention relates to a lifting system and more particularly to a device for lifting and lowering a small vehicle of the type used by handicapped persons in and out of a transporting vehicle such as an automobile or van.

Many disabled individuals rely on small power-driven vehicles, generally electric, for mobility. There are a number of such devices such as those sold under such names as "Amigo", "Pace Saver", "Rascal" and others. Generally these small vehicles are transported in a larger vehicle such as a van, automobile or truck and are unloaded when they are to be used. These small vehicles weigh up to 150#–160# and therefore it is necessary that some type of lifting device or ramp device be utilized for unloading the cart from the automobile or van and loading the motorized cart back into the vehicle. Accordingly, many individuals utilizing carts of this type will transport the cart in a vehicle or van which is specially modified having a ramp so that the motorized cart may be driven in and out of the van. Obviously this type of modification is expensive.

An alternate to specially modified vehicles having ramps is the use of a lifting device which enables the cart to be lifted in and out of the transporting vehicle. Some such lifting devices again are utilizable only with side door opening vans and thus require extensive installation or modification of the van.

Trunk-mounted devices can also be found in the prior art which devices are usable with conventional automobiles. Such lifting devices are in general either difficult for persons to operate when moving the cart between a stored position within the trunk and an unloaded position exterior of the trunk.

Reference is made to U.S. Pat. Nos. 3,804,263, 4,217,200 and 4,391,379. These patents are representative of motorized lifting devices utilizable with a vehicle.

Briefly, the present invention provides a lifting device for small motorized vehicles or carts which device is versatile and may be used with conventional vehicles, pick-up trucks, station wagons and even recreational vehicles. The device is extremely compact, adjustable to fit the physical requirements of the vehicle to which it is to be attached. Further, the device is usable to lift various models of carts and can be used to lift other objects.

The device includes a base which is securable to a vehicle as for example within the trunk of an automobile. The base has a stand which receives an adjustable mounting sleeve. The mounting sleeve carries journals to which a boom assembly is pivotally detachable so that it may be lifted from the base for storage. The boom assembly has an inner end with a mounting assembly which includes L-shaped pivot pins and a lifting mechanism. The lifting mechanism includes a reversible electric motor and a gear mechanism which selectively rotates a drum on which is wound a lifting cable or strap. The strap extends along the boom and from the distal of the boom and terminates at a hook or claw which is securable to the cart. The boom assembly is axially adjustable and the angular relationship of the boom to the vertical post or stand is adjustable at a removable support.

Other objects and advantages of the invention will become apparent by reference to the following specification, claims and to the drawings in which:

FIG. 1 is a perspective view of the lifting device of the present invention;

FIG. 2 is a sectional view taken along line 2—2 of FIG. 1;

FIG. 4 is a sectional view taken along line 4—4 of FIG. 1;

FIG. 5 is an enlarged detail view of the lower end of the support as indicated in FIG. 1;

FIG. 10 is a sectional view taken along line 10—10 of FIG. 9 showing the lift device in the stored position in an automotive trunk;

FIG. 11 is a view similar to FIG. 9 with the automobile trunk lid open illustrating the lifting device being pivoted to a lifting position; and FIG. 12 is a view similar to FIG. 11 with the lifting device pivoted to a position with the cart in a position exterior of the trunk.

Figure 3:
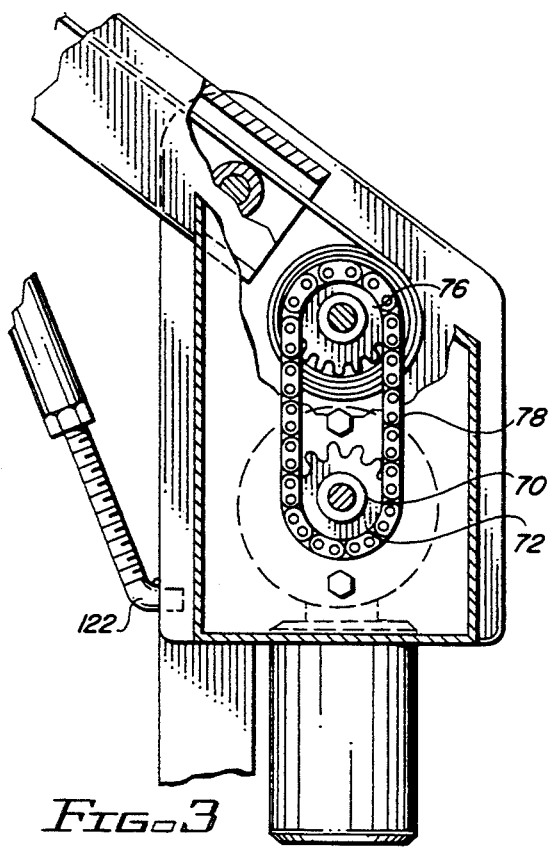
FIG. 3 is a sectional view taken along line 3—3 of FIG. 1.

Turning now to the drawings, the lifting device of the present invention is generally designated by the numeral 10 and is shown in FIG. 1. The lifting device 10 has two principal components which may be detached from one another for convenience of storage which include the support 12 and boom 14. The support 12 includes a base having a plurality of feet members 18 which may be secured by bolts in a convenient location. Referring to FIGS. 9-12, the device is shown as being mounted within the trunk space 25 of an automobile disposed at one side of the trunk adjacent the fender 26. Bolts 20 are secured to the floor panel 28 of the trunk. A stand 30 extends vertically from the base and consists of a lower tubular member 31 which may be welded or otherwise secured to the base and reinforced by gusset plates 32. The upper portion of the base consists of a rectangular sleeve member 34 which is vertically slidable along the lower stand member 31. The stand and sleeve members are shown as being of square tube stock and each has a plurality of holes 36 and 38, respectively. The holes 36 and 38 may be placed in registry and the upper and lower support members secured relative one to another by bolt 40. This adjustment allows the overall height of the support 12 to be adjusted in accordance with the physical requirements of the particular mounting, as for example, the requirements imposed by the space available in the trunk 25.

The upper tubular sleeve 34 is provided with a pair of spaced-apart journals 42 and 44 welded to one face of the tube. The journals are open-ended and vertically aligned as best seen in FIGS. 2 and 10. This allows the boom assembly 12 to be pivoted with respect to the base and also allows the boom to be lifted or detached from the base for storage or for removal to another vehicle.

The boom assembly 14 includes a pair of spaced-apart side plates 60 and 62 at the inner end of the boom. The side plate 62 is disposed adjacent the stand and a pair of L-shaped pivot shafts 64 and 66 are welded to the side plate. The vertically depending arm section 65 of the pivot shafts are pivotally receivable within the spaced-apart journals on the upper end of the stand. Thus, it will seem the boom assembly will pivot on a vertical axis about pivot arm section 65. It will also be seen that by vertically lifting the boom assembly 14, the arms 65 may be disengaged from their respective journals.

An electric drive motor 67, which is a reversible DC motor, is connectable via a control switch 68 to the electrical system of the vehicle is secured to the inner end of the boom and it has its output shaft in driving connection with gear box 70. The output shaft 71 of gear box 70 extends through side plate 64 and carries a gear 72. Shaft 74 is mounted above shaft 71 in suitable bearings and extends between side plates 60 and 62 and carries a reel or drum 75 about which is wound a flexible cable or strap 160. The outer end of shaft 74 carries a gear 76 which is driven through chain 78 extending between gears 72 and 76. The drive arrangement is selected so that the drum is driven at a suitable speed at adequate torque. As most motorized carts of the type to be lifted by the lifting device of the present invention weigh about 150#, the output shaft of motor 67 rotates at about 18 RPM. Gear reducer 68 is selected to reduce the speed so that pulley shaft 74 is driven at approximately 8 RPM.

Boom assembly 14 comprises an inner boom arm 92 and an outer boom arm 94. A shaft 90 extends between the side plates 60 and 62 at the upper ends thereof and pivotally carries inner end of the inner boom arm. Boom arm 92 is shown as a square tubular member which telescopically receives outer boom arm member 94. The outer boom arm member 94 is provided with a plurality of spaced-apart apertures 95 in the upper surface of the tubular member. Boom arm 92 includes a detent member 98 having a pin 100 and is normally held in the position shown in FIG. 4 by spring 102. The overall length of the boom assembly may be adjusted by lifting detent 100 upwardly to disengage the detent pin 100 from the particular aperture 95 and then axially sliding boom member 94 to the desired position. Release of the detent will engage the detent pin in the selected aperture.

The inner boom member 92 is provided with a handle 110 which is welded to the upper surface of the member to facilitate pivoting the boom and also securing and detaching the boom member from the vertical upright or post. The boom and motor are part of a single portable assembly. Thus, a user may use a single-boom assembly 14 with several transport vehicles by securing a support 12 to each of the vehicles and switching the portable boom to the desired vehicle. A quick connect electrical connector 112 may be provided for convenience.

The angular position of the boom to the upright or post is adjustable at brace member 115. The brace member 115 includes an arm 116 which is pivotally secured to the underside of boom arm member 92 at clevis 118. The opposite end of the arm includes a threaded member 120 which is axially adjustable with respect to arm 116 and once adjusted may be secured by lock nut 126. The distal end of threaded member 120 is bent at 122 as shown in FIG. 5 and may be selectively secured in one of the apertures 125 in tube member 130 which depends from forward edge of plate members 60 and 62.

Figure 6:
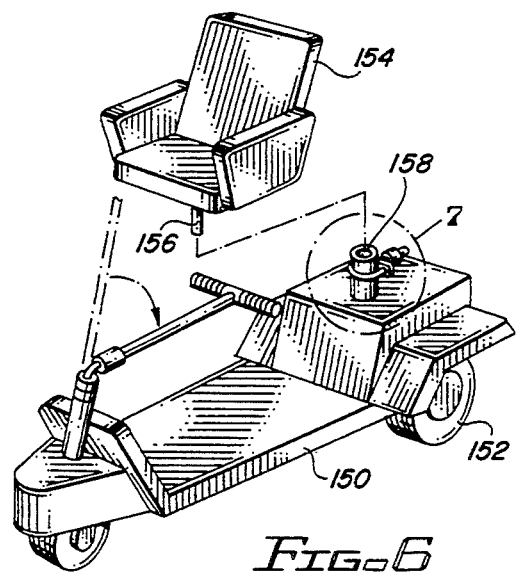
FIG. 6 is a perspective view of a typical motorized cart which may be lifted and lowered by the device of the present invention.
Figure 7:
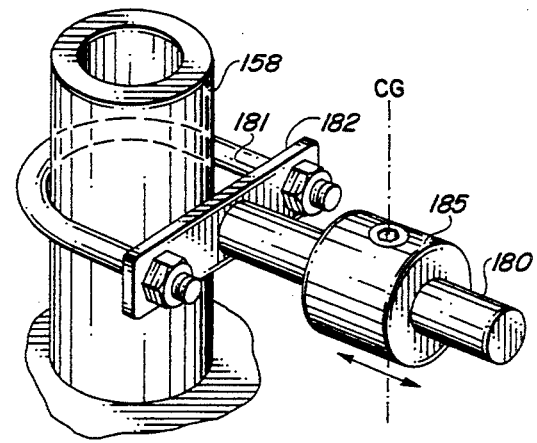
FIG. 7 is a detail view of a typical seat post assembly of the cart as indicated in FIG. 6.
Figure 9:
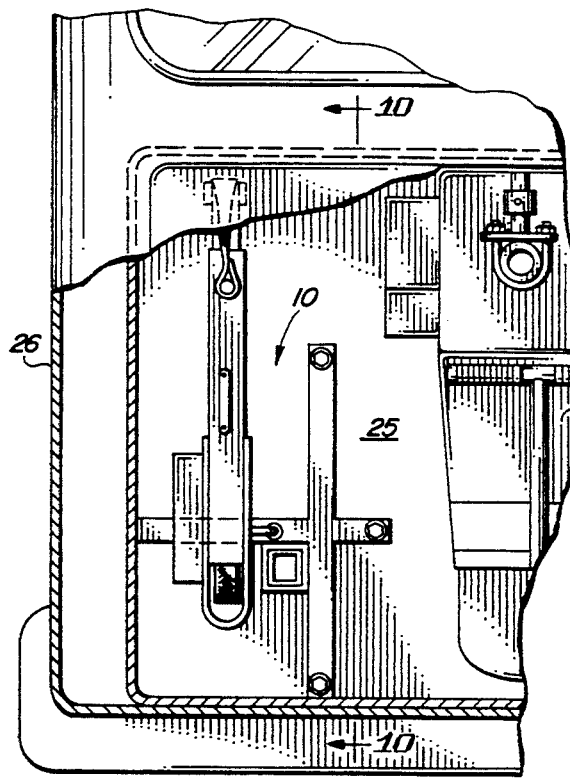
FIG. 9 is a plan view, partly broken away of a typical automobile truck showing the lift device and cart stored therein.
Figure 8:
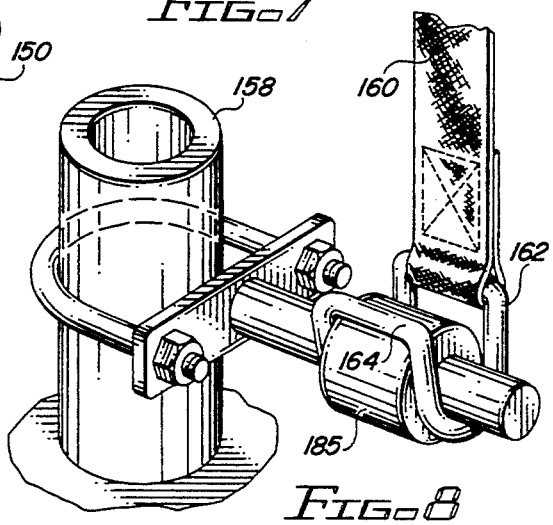
FIG. 8 is a view similar to FIG. 7 showing the lifting hook secured to a lift bolt secured to the seat post of the cart.

FIG. 6 illustrates a typical motorized cart of the type to be loaded or unloaded by the lifting device of the present invention. The motorized cart typically has a body 150 which is supported on wheels 152. A seat 154 has a vertically depending seat post 156 which is secured in pedestal 158. To facilitate lifting of the cart, the distal end of the strap 160 carries a lifting attachment 162 which has a pair of semi-circular, spaced-apart hooks 164. While the attachment 162 may be secured to any suitable convenient and structurally strong portion of the cart, it has been found that it is convenient to lift the cart from the seat post since in most cases the cart will be approximately balanced if suspended from this location. To facilitate lifting, a lifting lug as shown in FIGS. 7 and 8 may be provided. The lifting lug includes a lifting bolt 180 secured to a mounting plate 182 which in turn is secured to the seat post 158 by suitable U-bolt 184. The lifting bolt includes an axially adjustable collar 185. The lifting lug is positioned about the seat pedestal with the lifting bolt properly positioned, generally extending rearwardly from the seat post. The collar 185 is axially adjusted until properly positioned so that when the lifting hook is secured in the position shown in FIG. 8, the cart is generally balanced.

The lifting device of the present invention will be better understood from the following description of use. The device is suitably mounted in the carrying or transport vehicle as shown in FIGS. 10–12. In these figures, the device 10 is secured within the interior of the trunk of an automobile with the feet being bolted to the floor of the trunk 25 adjacent fender 26. Alternatively, the device could be bolted to the exterior of a recreational vehicle or in the cargo space of a pick-up truck or van. Once the base 18 is properly positioned, the upper portion of the stand is adjusted relative to the lower portion of the stand, taking into consideration of the physical requirements of the vehicle. For example, it will be necessary that sleeve 34 be positioned at a suitable elevation so that the boom 14 clears any obstructions such as the rear vehicle panel when the trunk is opened. The length of the boom arm is adjusted by disengaging detent 98 and extending the outer boom arm 95 to a suitable length so that the cart clears the rear of the vehicle when unloaded, as shown in FIG. 12. Similarly, the angularity of the boom relative to the stand may also be adjusted at brace 12. For convenience of storage, it may be desirable to fully retract the outer boom arm in the stored position. In the stored position, the device will be generally as shown in FIGS. 10 and 11 and it may be necessary to disengage the lower end of brace member 12 in order to obtain clearance below the trunk lid.

When it is desired to lift the cart 150 from the trunk of the automobile, the trunk lid is opened. The boom arm is extended to the desired position if necessary by actuation of detent 98. Similarly, the angular position of the boom arm to the stand may be adjusted by inserting the lower end of the support in the suitable aperture 125. The free end of the lifting strap 160 may be conveniently secured as shown in FIG. 10 in the stored position. The attachment 162 is disengaged and attached to the vehicle at a suitable position such as at the lifting bolt 180 in the manner shown in FIG. 8. Switch 68 is operated to energize the motor causing the cart to be lifted to a suitable elevation to clear the rear of the trunk. The boom may then be easily pivoted by manually grasping the arm and swinging the arm and cart outwardly. When the cart is in the position approximately as shown in FIG. 12 clear of the vehicle, the switch 68 may be operated to reverse the motor causing the lifting strap to extend to lower the cable to the ground.

In order to load the cart in the trunk, the procedure described above is reversed.

As seen, the lifting device of the present invention provides a convenient and compact device which can be used with various vehicles. The device provides adjustability to be adaptable with various configurations and types of carts and of transporting vehicles. The motor and gear arrangement is located at the inner end of the boom immediately adjacent the vertical support rather than along or at the end of the boom, adding weight to the boom.

While a preferred embodiment of the lifting device of the present invention has been shown and described above, it will be apparent to those skilled in the art that various modifications, changes and alterations may be made to the embodiment described herein without departing from the spirit and scope of the appended claims. To the extent that these various modifications, changes and alterations do not depart from the scope of the appended claims, they are intended to be encompassed therein.

We claim:

1. A lifting device for lifting objects in and out of a transporting vehicle having an electrical circuit, said lifting device comprising:

(a) a base securable to the transporting vehicle and a first vertical stand member secured to said base, said first vertical member including a plurality of bores therein;

(b) a second vertical stand member vertically slidable along said first vertical stand member and having a plurality of holes therein alignable with selected holes in said first vertical stand member and means for selectively securing said first and second vertical stand members at said holes, said second vertical stand member having a vertical axis and at least one journal bearing offset from said vertical axis of the second vertical stand member;

(c) a plate member with apertures detachably and pivotally secured to said second vertical stand member, a pivot shaft attached to said plate member and having a generally vertical axis and receivable in said journal bearing;

(d) a boom shaft on said plate having a generally horizontal axis offset from the axis of said second vertical stand member, a boom assembly having a first boom arm member being pivotally secured to said plate member at said boom shaft and a second boom arm member telescopically extendable with respect to said first boom arm member;

(e) means for securing said first and second boom arm members in a predetermined position relative to one another;

(f) an adjustable brace member with first and second ends, one of said ends being pivotally secured to said first boom arm member and the other one of said ends being selectively engageable in apertures in said plate member to position said boom assembly in a predetermined angular position with respect to said first and second vertical stand members;

(g) a drive motor secured to said first boom arm member at a position adjacent said second vertical stand member; and (h) a flexible strap member having attached and opposite ends, a reel member in driven engagement with said drive motor and having the attached end of the flexible strap member attached thereto, said flexible strap member extending from the reel member to the end of said second boom arm member, lifting means connected to the opposite end of said flexible strap member for engaging said object to be lifted.

2. The lifting device of claim 1 wherein said drive motor comprises a reversible DC electric motor having means connectable to the electrical circuit of the transporting vehicle and further including control means for selectively activating said drive motor.

* * * * *